June 10, 1930.  F. A. HIERSCH  1,762,515
SPEED WRENCH
Filed Sept. 11, 1929   2 Sheets-Sheet 1

INVENTOR
Fredrick A. Hiersch
BY
Clarence M. Tuck
ATTORNEY

June 10, 1930.   F. A. HIERSCH   1,762,515
SPEED WRENCH
Filed Sept. 11, 1929   2 Sheets-Sheet 2
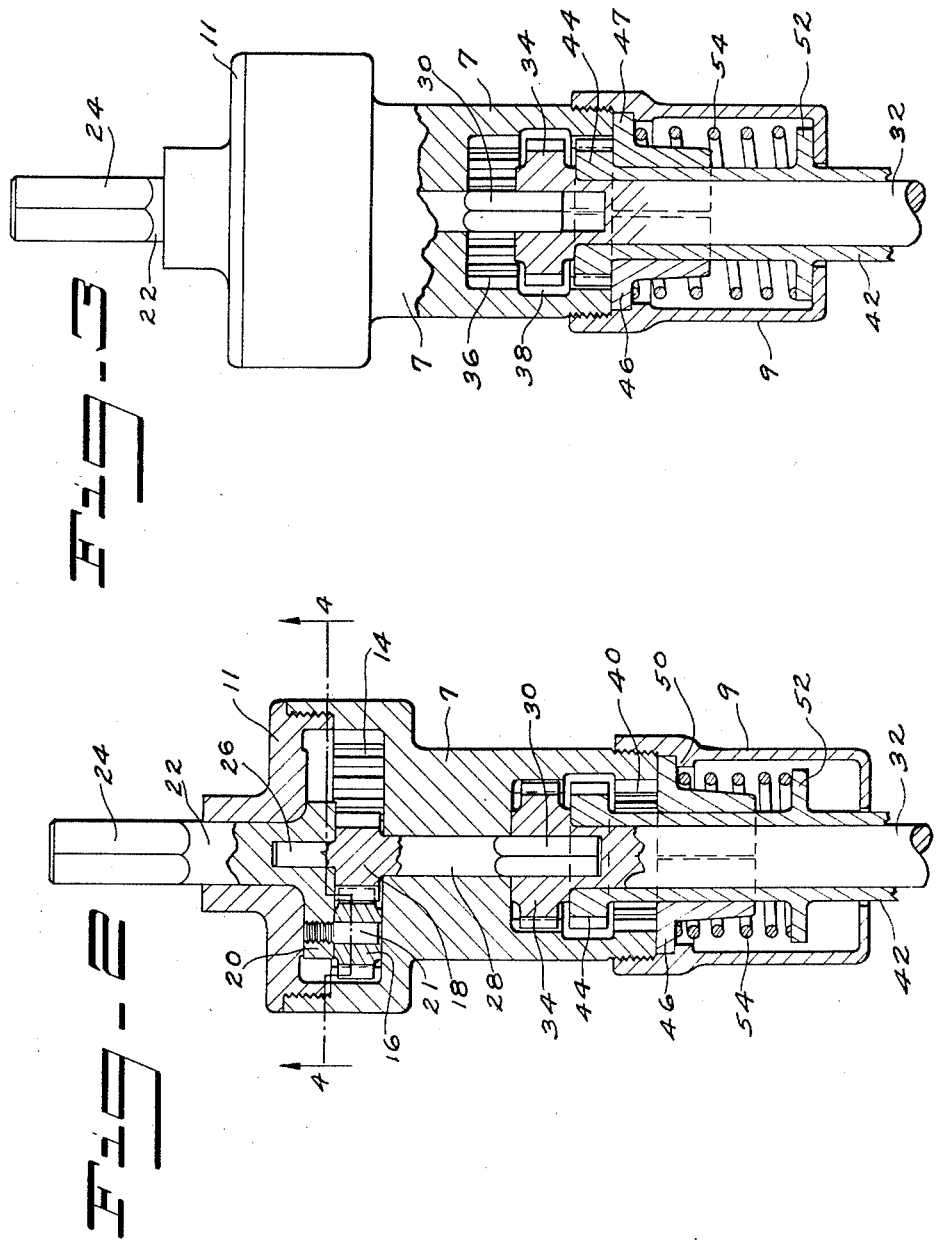
INVENTOR
Fredrick A. Hiersch
BY
Clarence M. Tuck
ATTORNEY Patented June 10, 1930

1,762,515

UNITED STATES PATENT OFFICE

FREDRICK A. HIERSCH, OF SEATTLE, WASHINGTON

SPEED WRENCH

Application filed September 11, 1929. Serial No. 391,769.

My invention relates to the art of wrenches and more particularly to the type of wrenches usually referred to as "speed" wrenches. Speed wrenches are used largely in the automotive repair business and are made necessary because of the fact that in the dissembling of an automobile upon which repairs are necessary it is usually necessary to remove quite a number of nuts or cap screws which are of the same size. Most speed wrenches are constructed along the line of the old hand auger, usually having a socket that sets over the nut to be removed, and having attached to the socket a crank-like handle which permits making full revolutions.

This type of wrench, of course, requires that one full revolution of the hand crank be made for each full turn of the nut. The crank handle must be so proportioned that the operator will have sufficient purchase upon the nut to loosen it, after which it usually turns freely. With the conventional type of wrench it is often necessary to make a number of turns with the nut just tight enough that it can not be turned easily by hand, which causes quite a loss of time.

In my wrench I provide an operating crank of any desired conventional type which is connected to the nut by an auxiliary device within which my invention is contained. The purpose of my device is to permit the operator to have the full purchase on the nut to facilitate loosening it by so locking my device that one turn of the crank turns the nut one turn. However, when the nut has become loosened my device then operates to cause one turn of the crank to make several turns of the nut, thus speeding up the unbolting operation, therefore:

The principal object of my invention is to provide means whereby full leverage may be obtained on a nut to loosen it, and after the nut is loosened to permit the operator to remove it very quickly.

A further alternate object is to provide a wrench wherein the speed may be reduced so that one turn of the operating crank may turn the nut it is desired to loosen but a fraction of a turn, and after the nut is loosened to permit the operator to change to a one to one ratio for removal of the nut. This is particularly desirable in removing large nuts.

Other and more specific objects will be apparent from the following description taken in connection with the accompanying drawings, wherein like reference numerals indicate like parts.

Figure 2 is a cross sectional view of the speed changing mechanism showing the mechanism locked together as it would be used in loosening a bolt.

Figure 3 is a similar view, but showing the mechanism in the manner it would be used when turning the bolt or nut faster than the handle is turned.

Figure 1:
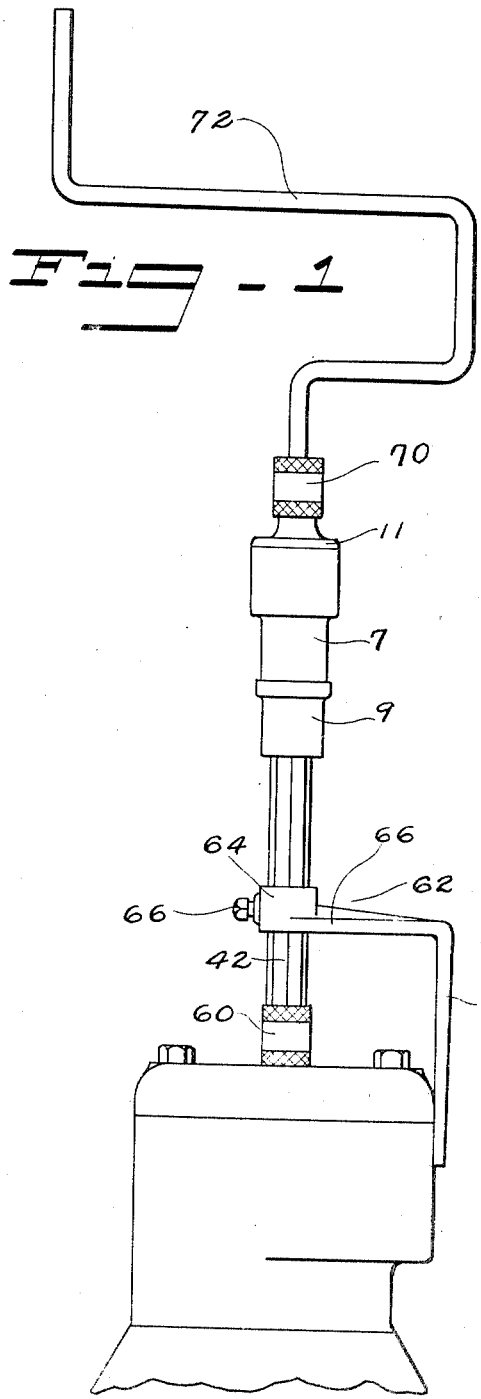
Figure 1 is an elevation showing my device in use removing a cylinder head nut from an automobile engine.
Figure 4:
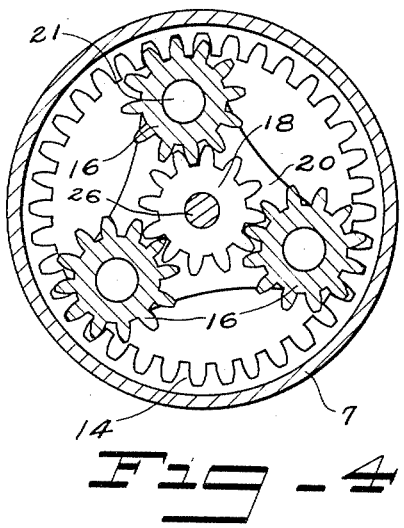
Figure 4 is a cross sectional view along the line 4—4 of Figure 2.
Figure 5:
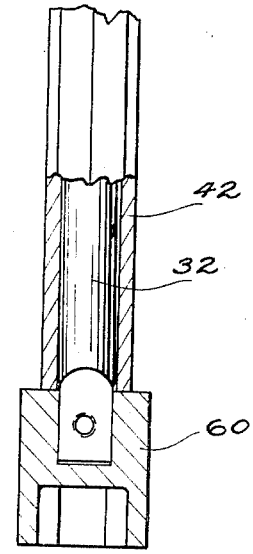
Figure 5 is a fragmentary view partially in section showing the co-action between the nut socket and the adjoining part of my device.

Referring to the drawings, numeral 7 designates the main body portion of the speed change housing having secured to its lowermost end the spring housing 9 and to its upper end the cover plates and planet carrier guide 11. Cut within the enlarged upper portion of housing 7 is the internal gear 14 with which is meshed a plurality of planet gears 16.

The planet gears in turn mesh with the central pinion 18. Planet gears 16 are secured to the planet carrier spider 20 by the bearing pins 21. The spider 20 has formed on its upper surface the upwardly extending shaft 22 which is journaled within the bearing plate 11 and has an outward projection 24 which is flat sided to receive a wrench of any desired type.

Pinion 18 may be journaled in any convenient manner. I have indicated an upward projecion 26 journaled within member 22 and a downwardly extending round shaft 28 which is journaled within the housing 7. The lower end of shaft 28 is flattened at 30 in order that it may transmit a turning movement to the operating shaft 32.

In the upper end of shaft 32 is a recess having flattened sides to accommodate the flattened portion 30 of shaft 28. Also formed on the upper end of shaft 32 is the tooth ring 34. This may be of any convenient design such as a gear or perhaps a more simple arrangement is the adoption of a standard spline. For clarity of description this may be considered a gear.

Formed within housing 7 is an internal gear or splining 36 adapted to receive gear 34. Immediately below gear 36 is a relieved portion 38 which is of such size that gear 34 may be turned freely in it. Immediately below chamber 38 is a second internal gear 40. I usually construct 36 and 40 as one continuous gear or splining and then counterbore to form the chamber 38. This is a mere manufacturing expedient as there is no direct size relationship necessary between 36 and 40.

Encircling shaft 32 is a tube 42, which I normally prefer to have a flat sided exterior, excepting that portion which is contained within housings 7 and 9, which, because of the necessity of forming bearings thereon must be round. Secured to the upper end or possibly made a part of tube 42 is a gear 44 which is adapted to engage the internal gear 40, and is of such proportion that it will turn freely within the chamber 38. In order to hold shaft 32 and tube 42 central with my device I provide a split bearing formed of two half members 46 and 47. These are retained in position by an annular ledge 50 within the housing 9. Formed as part of tube 42 or attached thereto is an annular ring 52 which serves as a spring rest for the compression spring 54. I have shown the upper end of spring 54 in contact with the under side of the flange of the split bearings 46 and 47. However this relationship is not essential as long as the spring operates to press tube 42 downwardly as shown in Figure 3.

Referring to Figure 1, 60 represents a detachable socket secured to shaft 32. This attachment may be secured in any convenient manner as it is my intention to use sockets from the standard socket wrench sets, consequently I have made no showing of this feature.

Pressing down upon socket 60 is the tube 42 having flat sides whose purpose is to prevent the fitting 62 from turning thereupon. Fitting 62 consists of hub member 64 having therein a set screw 66 or some equivalent locking means, an outwardly extending portion 66 with a downwardly extending portion 68. The purpose of this device is to prevent the turning of tube 42 when the downwardly extending portion 68 is caused to contact a solid portion of the machine that is being worked upon.

The reduction gear portion is shown in outline and has another socket 70 which is adapted to engage the flattened portion 24 of the spider shaft 22. Secured to socket 70 is a crank of any desired type. As each operator has his own idea of the type of crank most desirable, I prefer to construct my device so that any desired type of crank may be used with it.

*Method of operation*

In operating my device the socket 60 of the proper size is fitted to the squared end of shaft 32, and caused to engage the nut it is desired to remove. The operator then presses downwardly on the operating handle 72 until the speed changing device assumes the position shown in Figure 2 wherein gear 34 meshes with the internal gear 36, and gear 44 is in the chamber 38 where it is free to revolve.

Inasmuch as gear 34 is locked into housing 7 turning handle 72 and its shaft 22 will cause the whole housing to revolve as a unit.

The sleeve 42, however, inasmuch as gear 44 is free to revolve within the housing, will not be turned. In this position the operator has the maximum advantage over the nut it is desired to loosen and after the nut has been freed or loosened the downward pressure is released on the handle 72 and the compression spring 54 will be free to restore the speed changing device to its normal position as indicated in Figure 3. In this position tube 42 is secured against rotation by the locking member 62 and its downwardly extending portion 68.

Gear 44, which is secured to the upper end of tube 42, is now in mesh with the internal gear 40, and thus locks the whole housing 7 against rotation.

Now, when turning effort is applied to shaft 22 by means of the crank 72, the planet gears 16 revolve about the central axis of the device and as they are in constant mesh with the internal gear 14 they will impart a higher speed to pinion 18, which will be in direct relation to the number of teeth contained in the internal gear 14 and the pinion 18. It will be apparent that if a different ratio be desired it is only necessary to change the ratio of the teeth in gears 14 and 18.

I believe it will also be apparent that my device might be reversed in its general construction so that instead of giving a higher speed to shaft 32 that a lower speed could be obtained which would have the same general speed ratios. Believing that this feature of my device will be so apparent to those skilled in this art I have not made any showing of this modification as it would be merely a duplication of the present views with the power applied by handle 72 to the shaft 28 and with the shaft 22 engaging shaft 32.

I believe the foregoing description and accompanying drawings clearly disclose a preferred embodiment of my invention, but it will be understood that this disclosure is merely illustrative and that such changes in the invention may be made as are fairly within the scope and spirit of the following claims.

What I claim is:

1. A speed wrench of the class described comprising a nut or bolt engaging member, an operating shaft engaging said member, change speed gearing capable of imparting different speeds to said shaft, a tube encircling said shaft having stop means adjustably secured thereto, a gear secured to the upper end of said tube, another gear secured to the upper end of the operating shaft, two internal gears adapted to engage said gears, a relieved chamber which is longer than either of said gears separating said internal gears, a driven shaft slideably connecting the operating shaft and the speed change gearing, and means for driving the said speed change gearing.

2. A speed wrench of the class described comprising a nut or bolt engaging member, an operating shaft engaging said member, a planetary change speed gearing formed of an internal gear made as part of the gear housing, a plurality of planet gears and a driven gear, a driving shaft slideably connecting the driven gear and the operating shaft, a tube encircling said operating shaft having stop means adjustably secured thereto, a gear secured to the upper end of said tube, another gear secured to the upper end of the operating shaft, two internal gears adapted to engage said gears, a relieved chamber which is longer than either of said gears separating said internal gears, and means for driving the said speed change gearing.

3. A speed wrench of the class described comprising a nut or bolt engaging member, an operating shaft engaging said member, a planetary change speed gearing formed of an internal gear made as part of the gear housing, a plurality of planet gears and a driven gear, a driving shaft slideably connecting the driven gear and the operating shaft, a tube encircling said operating shaft having stop means adjustably secured thereto, a gear secured to the upper end of said tube, another gear secured to the upper end of the operating shaft, two internal gears adapted to engage said gears, a relieved chamber which is longer than either of said gears separating said internal gears, an annular ring secured to said tube, a compression spring engaging said ring and disposed to exert an outward pressure on said tube, guide means adapted to maintain the operating shaft and the encircling tube central with the device, and means for driving the said speed change gearing.

In witness whereof, I hereunto subscribe my name this 31st day of August A. D. 1929.
FRED A. HIERSCH.